(12) United States Patent
Kagawa

(10) Patent No.: US 7,783,203 B2
(45) Date of Patent: Aug. 24, 2010

(54) SYSTEM AND METHOD FOR CONTROLLING A DIFFERENCE IN OPTICAL PHASE AND AN OPTICAL SIGNAL TRANSMITTER

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 736 days.

(21) Appl. No.: 11/650,996

(22) Filed: Jan. 9, 2007

(65) Prior Publication Data

US 2007/0165679 A1    Jul. 19, 2007

(30) Foreign Application Priority Data

Jan. 16, 2006 (JP) .............................. 2006-007618

(51) Int. Cl.
*H04B 10/04* (2006.01)
*H04B 10/12* (2006.01)
*H04J 14/08* (2006.01)

(52) U.S. Cl. ...................................... 398/185; 398/102
(58) Field of Classification Search .................. 398/98, 398/102, 185
See application file for complete search history.

(56) References Cited

U.S. PATENT DOCUMENTS

| 7,224,906 B2 * | 5/2007 | Cho et al. .................... 398/183 |
| 2004/0013428 A1 * | 1/2004 | Nakajima et al. .............. 398/43 |
| 2004/0105684 A1 * | 6/2004 | Marutani et al. ............. 398/147 |

FOREIGN PATENT DOCUMENTS

| JP | 2004-023537 |   | 1/2004 |
| JP | 2005-006174 |   | 1/2005 |
| JP | 2005-006176 |   | 1/2005 |
| JP | 2005-6176 | * | 1/2005 |

OTHER PUBLICATIONS

Masatoshi Kagawa, et al., "Performance Comparison of Bitwise Phase-controlled 160 Gbit/s Signal Transmission Using an OTDM Multiplexer with Phase-correlation Monitor", 30th European Conference on Optical Communication, Sweden, Sep. 2004.
Masatoshi Kagawa, et al., "160 Gbit/s OTDM Channel Identification using Optical Phase Index with 40 Gbit/s Clock Recovery Circuit", 3lth European Conference on Optical Communication, Scotland, Sep. 2005.

* cited by examiner

*Primary Examiner*—Nathan M Curs
(74) *Attorney, Agent, or Firm*—Rabin & Berdo, P.C.

(57) ABSTRACT

An optical phase difference control system is provided for controlling a phase difference of a single optical time-division multiplexed signal obtained by multiplexing a plurality of modulated optical signals encoded. The control system includes an interferometer and a low-frequency extractor. The interferometer is used for receiving part of the optical time-division multiplexed signal to split it into first and second signals, giving, between the first and second signals, a phase difference equivalent to one bit of the optical time-division multiplexed signal, and thereafter multiplexing the first and second signals. The low-frequency extractor is used for adding together signals, output from the interferometer, which have the similar intensity every two successive bits, and extracting a low-frequency waveform signal as a signal for controlling the phase difference of the single optical time-division multiplexed signal.

8 Claims, 4 Drawing Sheets

| | CHANNEL | 4 | 1 | 2 | 3 | 4 | 1 | 2 | 3 | ... |
|---|---|---|---|---|---|---|---|---|---|---|
| (a) | RELATIVE PHASE OF 4-CH OTDM SIGNAL | 0 | $\phi$ | $\pi$ | $\phi$ | 0 | $\phi$ | $\pi$ | $\phi$ | ... |
| (b) | RELATIVE PHASE OF 1-BIT DELAYED SIGNAL | $\phi$ | $\pi$ | $\phi$ | 0 | $\phi$ | $\pi$ | $\phi$ | 0 | ... |
| (c) | PHASE DIFFERENCE | $\phi$ | $\pi-\phi$ | $\phi-\pi$ | $-\phi$ | $\phi$ | $\pi-\phi$ | $\phi-\pi$ | $-\phi$ | ... |

SYSTEM AND METHOD FOR CONTROLLING A DIFFERENCE IN OPTICAL PHASE AND AN OPTICAL SIGNAL TRANSMITTER

BACKGROUND OF THE INVENTION

1. Field of the Invention

The present invention relates to an optical phase difference control system and method, and an optical signal transmitter that control a phase difference of an optical time-division multiplexed (OTDM) intersymbol carrier wave.

2. Description of the Background Art

For example, in a high-speed optical transmission system with a transmission rate of 40 Gbit/s or more, if longer-distance transmission is to be performed, the input intensity of an optical signal must be increased. However, an increase in the input intensity will cause waveform degradation due to a nonlinear effect in optical fibers, resulting in transmission quality degradation.

To prevent the waveform degradation, CS-RZ (Carrier Suppressed Return-to-Zero) modulation is utilized, which has the advantage of being able to suppress a nonlinear effect in optical fibers to enhance dispersion proof stress and other advantages. CS-RZ modulation is the technique of inverting an optical carrier phase between adjacent pulses, i.e., adjacent bits, in an optical signal pulse train. The CS-RZ modulation is able to suppress high-level carrier frequency components contained in NRZ (Non-Return-to-Zero) signals or RZ (Return-to-Zero) signals and generate pulse signals of which the occupied bandwidth is suppressed to about one-half as broad as the NRZ or RZ signals. In this manner, even when long-distance transmission is performed, it is less susceptible to waveform degradation due to optical fiber wavelength dispersion or optical nonlinearity.

CS-RZ modulation has many combinations of optical carrier phases between adjacent pulses. Among them, the combinations, $(0, \pi, 0, \pi)$, $(0, \pi/2, 0, \pi/2)$, $(0, 0, \pi, \pi)$, and $(0, 0, 0, \pi)$ are less liable to cause degradation due to a nonlinear optical effect during fiber transmission. For instance, the combination $(0, \pi, 0, \pi)$ means the multiplexing of four waves. If the four waves are represented by a first, a second, a third and a fourth wave, respectively, the numerical values in the combination $(0, \pi, 0, \pi)$ represent the phase differences of the carrier light-wave of the first, second, third, and fourth waves with respect to the phase of the first wave. The combination $(0, \pi, 0, \pi)$ means that the phase differences of the carrier light-wave between the first and second waves, between the second and third waves, and between the third and fourth waves are all $\pi$ (pi) in radian.

If any of the above-described four phase relationships cannot be preserved and therefore a shift in phase occurs, degradation due to a nonlinear optical effect will be caused. If phase relationships are to be preserved, an optical carrier phase difference between adjacent pulses has to be controlled. A conventional optical phase control system and optical signal transmitter are disclosed in Japanese patent laid-open publication Nos. 2004-23537, 2005-6176, and 2005-6174 by way of example, hereinafter referred to as Documents D1, D2 and D3, respectively.

In the inventions disclosed in Documents D1 and D2, the combination $(0, \pi, 0, \pi)$ is adopted as a combination of optical carrier phases. To perform the detection and control of an optical phase difference between bits, part of a signal to be transmitted is taken out and input to an interferometer. In those two prior art documents, to detect and control such a carrier phase difference between bits, part of a modulated optical signal, i.e. CS-RZ modulated optical signal, is taken out and split into two optical signals. Subsequently, with a delay unit, between the two split modulated optical signals, theirs carrier waves are given a phase difference equivalent to the amount of, for example a one-bit delay. Next, by multiplexing the two waves, the carrier waves of adjacent bits are caused to interfere with each other. The interference light-wave is monitored; the time average value of the optical power thereof is converted into an electrical signal (monitored voltage); and based on the converted value, the carrier phase difference is detected and controlled.

In the two documents, i.e. D1 and D2, the carrier phase difference between adjacent bits in CS-RZ modulation is in a state of $\pi$(pi), i.e., the state in which the phases of the carrier waves are inverted with each other. When the carrier waves are caused to interfere with each other after being given a delay of one bit in an interferometer, if the phases of the carrier waves of the modulated optical signals have no phase shift, the phases of the carrier waves are inverted with each other. Therefore, because of light-wave interference, they cancel out each other and become extinct. On the other hand, when the carrier waves are caused to interfere with each other after being given a delay of one bit in an interferometer, if the phases of the carrier waves of adjacent modulated optical signals are shifted from a predetermined value by $\pi$, the phases of the carrier waves are the same. Therefore, because of light-wave interference, they strengthen each other. This means that when the carrier phase difference between bits of 1-bit delayed interference light-wave is $\pi$, a monitored voltage based on the optical power of interference light-wave is a minimum, and when the carrier phase difference is zero, the monitored voltage takes its maximum.

Therefore, as the carrier phase difference between bits of a modulated optical signal is shifted from a predetermined value, $\pi$, the monitored voltage of the multiplexed optical output signal, i.e., interference light-wave becomes higher. When the carrier phase difference between bits is shifted by $\pi$ and becomes 0, the multiplexed output light-wave, i.e. interference light-wave, is most strengthened, and consequently, the monitored voltage takes its maximum.

Hence, if the carrier phase difference between bits changes from $\pi$ to 0, the time average value of multiplexed output light-wave changes from its minimum to maximum. If the time average value is monitored and fed back to a difference in optical path length, control of the carrier phase difference between bits becomes possible in the two documents. In addition to control of the carrier phase difference between adjacent bits, both documents have proposed that the carrier phase difference between bits that are two or more bits away from each other is controlled in the same manner.

In the two documents, to generate a signal having a phase relationship of $(0, \pi, 0, \pi)$, two light waves A, which have a phase relationship of $(0, 0)$ in which there is no phase difference, are generated and two light waves B, which have a phase relationship of $(\pi, \pi)$ in which the phase difference is $\pi$ with respect to the light waves A, are generated. Next, the light waves A and light waves B are temporally shifted and combined into a single signal with a phase difference of $(0, \pi, 0, \pi)$.

Well, the remaining document, D3, discloses that when a signal with a phase relationship of $(0, 0, 0, \pi)$ is received, a clock signal synchronized with a transmission signal is generated by a interference light-wave between the received signal and this signal after being delayed a period of one bit, as previously described. In the method of reception disclosed in Document D3, attention is directed to the fact that in the case of a signal with a phase relationship of $(0, 0, 0)$, interference light-wave, which is obtained between that signal and a signal in which the phase relationship of (0, 0, 0) is respectively shifted one bit by bit, contains a portion in which phase differences of (0, 0) overlap. In other words, a frequency component equal to half of that of the received signal is obtained from that overlapping portion. Note that Document D3 does not disclose phase difference control of transmission signals.

The transmission signal described in Document D3 can be generated by the transmitter disclosed in Document D1 or D2. However, the use of the transmitter makes it difficult to perform phase difference control. This problem will be described hereinafter.

In the case where the conventional system disclosed in Document D1 or D2 is used when generating an optical phase condition of (0, 0, 0, π) disclosed in Document D3, four separate signals with a transmission rate of x bit/s to be multiplexed are employed in order to generate four separate signals that have a transmission rate of 2x bit/s, which is twice as high as the former. In Document D2, four separate signals are generated so that the phases of the carrier light-wave respectively have (0, π) and (0, 0). The four separate signals are multiplexed into a single signal with a transmission rate of (4x bit/s) equal to four times as high as the transmission rate (x bit/s) of each separate signal.

Since optical phases before being multiplexed are preserved at (0, π) and (0, 0), if a phase difference of φ is present between two optical signals with a phase relationship of (0, π) and two optical signals with a phase relationship of (0, 0), the 4x-bit/s multiplexed optical signal has a phase relationship of (0, φ, π, φ), where the φ denotes the phase difference between two 2x-bit/s signals after they are multiplexed to a 4x-bit/s signal. As shown in FIG. 2, the 4x-bit/s signal interferes in phase differences of (φ), (π−φ), (φ−π), and (−φ) at 1-bit intervals, within the interferometer disclosed in Document D2. FIG. 2, line (a), shows the relative phase of each bit of a transmission signal, that is, carrier light-wave of each channel, with the fourth channel as reference. FIG. 2, line (b), shows the relative phases of a signal obtained by delaying each bit of the transmission signal of FIG. 2, line (a), by one bit. FIG. 2, line (c), shows the relative phases of a signal obtained by causing the signals shown in FIG. 2, lines (a) and (b), respectively to interfere with each other. The relative phase shown in FIG. 2, line (c), is a difference in phase between the signals shown in lines (a) and (b).

FIG. 3 shows intensity changes of interference light-wave with respect to an increase or decrease in φ. The horizontal axis of FIG. 3 represents φ (radian), while the vertical axis represents intensity. A curve 100 shows intensity changes of interference light-wave whose phase difference is φ or −φ. A curve 102 shows intensity changes of interference light-wave whose phase difference is (π−φ) or (φ−π). As shown by the curve 100, the intensity of interference light-wave whose phase difference is φ or −φ changes in the same manner with an increase or decrease in φ. As shown by the curve 102, the intensity of interference light-wave whose phase difference is (π−φ) or (φ−π) changes in the same manner with an increase or decrease in φ. The curve 100 and curve 102 change to cancel out each other with respect to an increase or decrease in φ. Considering that in a normal digital transmission signal the ratio between 1s and 0s is ½, the resultant average output intensity does not change even if φ fluctuates. That is, the conventional technique disclosed in Document D1 or D2 cannot achieve the stability of the transmission signal disclosed in Document D3. The reason why Document D1 or D2 can control a phase difference is that since Document D1 or D2 uses a signal with a phase relationship of (0, π, 0, π), the phase difference of interference light-wave between a 1-bit delayed signal and a signal before being delayed is always (π−φ) or (φ−π), not φ and −φ. That means that, since interference light-wave equivalent to the curve 100 does not occur, there is no possibility that the curve 100 and curve 102 will cancel out each other.

SUMMARY OF THE INVENTION

It is the primary object of the present invention to provide an optical phase difference control system and method, and an optical signal transmitter that are capable of controlling the phase difference of the transmission signal as disclosed in Document D3.

In accordance with the present invention, there is provided an optical phase difference control system for controlling a phase difference of a single optical time-division multiplexed signal obtained by multiplexing a plurality of modulated optical signals encoded. The optical phase difference control system comprises two major components: (1) an interferometer for receiving part of the optical time-division multiplexed signal to split it into first and second signals, and multiplexing the first and second signals after giving, between the first and second signals, a phase difference equivalent to one bit of the optical time-division multiplexed signal; and (2) a low-frequency extractor for adding together signals, output from the interferometer, which have the similar intensity every two successive bits, and extracting a low-frequency waveform signal as a signal for controlling the phase difference of the single optical time-division multiplexed signal.

In the optical phase difference control system of the present invention, the interferometer splits part of the optical time-division multiplexed signal into first and second signals, and multiplexes the first and second signals after giving a phase difference equivalent to one bit of the optical time-division multiplexed signal, whereby the similar intensity are obtained every two successive bits. By making use of this principle, the low-frequency extractor adds together signals which have the similar intensity every two successive bits, and extracts a low-frequency waveform signal as a signal for controlling the phase difference of the single optical time-division multiplexed signal. Using this signal, feedback control is performed on the modulators, or a material, which can change a difference in optical path length, such as a glass block, is controlled.

In accordance with the present invention, there is provided an optical signal transmitter, which comprises six major components: (1) a plurality of modulators for outputting a plurality of modulated optical signals obtained by encoding a plurality of optical input short-pulse trains thereto; (2) a first interferometer for receiving part of a single optical time-division multiplexed transmission signal, obtained by multiplexing the plurality of modulated optical signals encoded in the modulators, to split it into first and second signals, and multiplexing the first and second signals after giving, between the first and second signals, a phase difference equivalent to one bit of the optical time-division multiplexed signal; (3) a low-frequency extractor for adding together signals, output from the first interferometer, which have the similar intensity every two successive bits, and extracting a low-frequency waveform signal as a signal for controlling the phase difference of the single optical time-division multiplexed signal; (4) a second interferometer for receiving one of two optical time-division multiplexed transmission signals being under multiplexing, obtained by multiplexing the plurality of modulated optical signals, to split it into third and fourth signals, and multiplexing the third and fourth signals after giving, between the third and fourth signals, a phase difference equivalent to one bit of the one optical time-division multiplexed signal; (5) a third interferometer for receiving the other of the two optical time-division multiplexed transmission signals to split it into fifth and sixth signals, and multiplexing the fifth and sixth signals after giving, between the fifth and sixth signals, a phase difference equivalent to one bit of the other optical time-division multiplexed signal; and (6) a controller connected to the modulators and the first, second, and third interferometers for receiving the optical time-division multiplexed signals from the second and third interferometers and adjusting the modulators so that an optical phase difference in the two optical time-division multiplexed signals is zero, and for adjusting the modulators so that the signal extracted by the low-frequency extractor takes its maximum value.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

A preferred embodiment of an optical signal transmitter according to the present invention will hereinafter be described with reference to the drawings. In the preferred embodiment, the present invention is applied to an optical signal transmitter which adopts an OTDM (Optical Time-Division Multiplexed) transmission system for time-division multiplexing four modulated optical signals obtained by CS-RZ (Carrier Suppressed Return-to-Zero) modulation, and which realizes optical transmission at a transmission rate of 160 Gbit/s.

Figure 1:
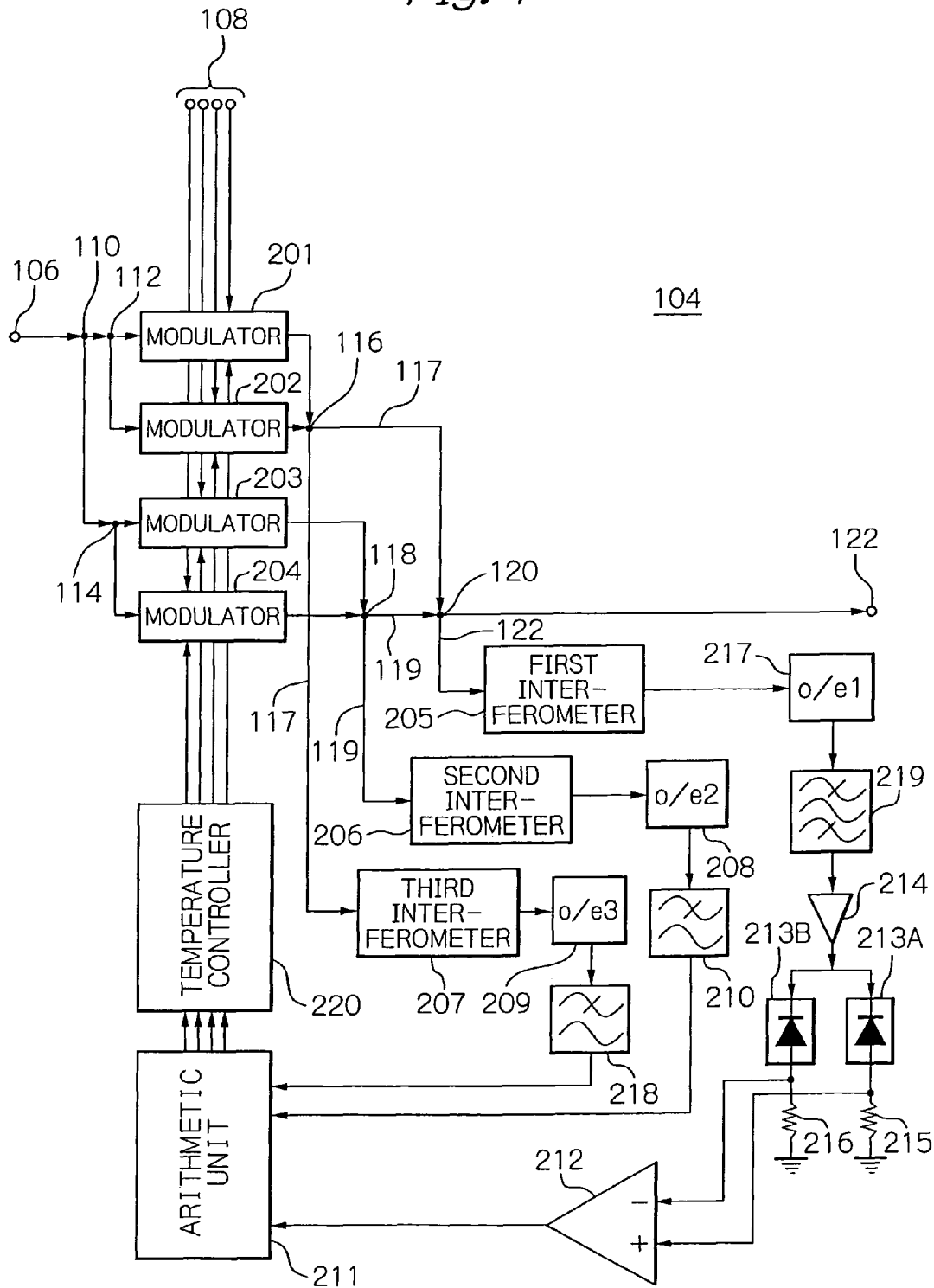
FIG. 1 is a schematic block diagram showing a preferred embodiment of an optical signal transmitter according to the present invention.

The optical signal transmitter will be described with reference to FIG. 1. FIG. 1 is a schematic block diagram of the optical signal transmitter, which is generally designated by a reference numeral 104. The optical signal transmitter 104 has an optical short-pulse source 106, and is configured so that it time-division multiplexes input signals 108 of four channels into a single optical output signal 122.

The optical signal transmitter 104 mainly comprises an optical circuit group and an electric circuit group. The optical circuit group includes an optical short-pulse source 106, three optical splitters 110, 112 and 114, four modulators 201, 202, 203 and 204, three couplers 116, 118 and 120, a first interferometer 205, a second interferometer 206, and a third interferometer 207, a first, a second and a third optoelectronic IC (Integrated Circuit) 217, 208 and 209.

The optical short-pulse source 106 functions to generate an optical short-pulse train, which is output to the optical splitters 110, 112 and 114. The optical splitters 110, 112 and 114 are placed in the optical paths leading from the optical short-pulse source 106 to the modulators 201, 202, 203 and 204 to split an optical short-pulse train output from the optical short-pulse source 106. That is, the optical splitters 110, 112 and 114 function to split an optical short-pulse train into four optical short-pulse trains, which are output to the modulators 201, 202, 203 and 204.

The phase differences of the four optical short-pulse trains are set by changing the drive temperatures of the modulators 201, 202, 203 and 204 to make the optical lengths different from each other. This is based on the principle that, if the drive temperatures of the modulators 201, 202, 203 and 204 are changed, the waveguide lengths of the modulators are changed. Although the details are to be described later, the modulators 201, 202, 203 and 204 are controlled by temperature so that the phase difference between optical signals passing through the modulators 201 and 203 is $\pi$ and the phase difference between optical signals passing through the modulators 202 and 204 is zero. The phase differences at this time can be detected by an appropriate method which is known itself. At the same time, the modulators 201, 202, 203 and 204 are controlled depending upon temperature so that the phase differences between optical signals passing through the modulators 201, 202, 203 and 204 are $(0, 0, \pi, 0)$ or $(0, \pi, \pi, \pi)$, with the optical signal passing through the modulator 201 as reference. The phase differences at this time cannot be detected by any known method.

The couplers 116, 118 and 120 function to multiplexe optical signals modulated in the modulators 201, 202, 203 and 204. The lengths of the optical paths leading from the modulators 201, 202, 203 and 204 to the couplers 116, 118 and 120 are set so that the delays between bits output by the modulators 201, 202, 203 and 204 are each equivalent to ¼ bit.

The modulators 201, 202, 203 and 204 function to receive four optical short-pulse trains split in the splitters 110, 112 and 114, and also function to receive the electrical signals 108, which are data signals, through corresponding biasing circuits, not shown. Based on the electrical signals 108, the modulators 201, 202, 203 and 204 function to encode the optical short-pulse trains, which are output in the form of modulated optical signals.

Each of the interferometers 205, 206 and 207 functions to split the modulated optical input signal between two optical paths, not shown, provided inside. The two optical paths are different in optical path length from each other. In this manner, a phase difference is given between the two split optical signals. Within each of the interferometers 205, 206 and 207, the two optical signals are subsequently multiplexed so that they interfere with each other.

The first interferometer 205 is used for receiving part of a single time-division multiplexed optical transmission signal 122 obtained by time-division multiplexing a plurality of modulated optical signals encoded in the modulators 201, 202, 203 and 204, to split it into two signals, and subsequently multiplexing the two split signals after giving, between them, a phase difference equivalent to one bit of the time-division multiplexed optical transmission signal. The first interferometer 205 has an optoelectronic circuit for converting optical intensity of the part of the single optical time-division multiplexed signal into corresponding electrical intensity The second interferometer 206 is used for receiving part of one signal 119 of two time-division multiplexed optical signals 117, 119 that are under multiplexing, obtained by time-division multiplexing a plurality of modulated optical signals, to split it into two signals, and subsequently multiplexing the two split signals after giving, between them, a phase difference equivalent to one bit of the one time-division multiplexed optical signal 119. As previously described, the optical signals input to the second interferometer 206 are outputs of the modulators 203 and 204, and the phase difference between the carrier signals of these optical signals is always equal to $\pi$. For that reason, by conventional methods, a 1-bit delayed signal is caused to interfere with a single before being delayed, and based on the interference light-wave, the phase difference can be controlled.

The third interferometer 207 is used for receiving part of the other signal 117 of the aforementioned two time-division multiplexed optical signals 117 and 119 to split it into two signals, and subsequently multiplexing the two signals after giving, between them, a phase difference equivalent to one bit of the other time-division multiplexed optical signal 117. The optical signals input to the third interferometer 207 are outputs of the modulators 201 and 202, and the phase difference between the carrier signals of these optical signals is always zero. For that reason, by conventional methods, a 1-bit delayed signal is caused to interfere with a single before being delayed, and based on the interference light-wave, the phase difference can be controlled.

The optical signals input to the first interferometer 205 are outputs of the modulators 201, 202, 203 and 204, and the phase differences between the carrier signals of these optical signals are 0 and $\pi$. For that reason, as previously described, even if a 1-bit delayed signal is caused to interfere with a signal before being delayed, conventional methods cannot control the phase difference of the interference light-wave.

In the first interferometer 205, input light-wave is delayed by a period substantially equal to ¼ of the bit time slot of the optical input short-pulse train 106, that is, the bit time slot of the optical output signal 122, and is multiplexed. In the second interferometer 206 and third interferometer 207, one optical path is given a time delay with respect to the other optical path, and is delayed by a period of time twice as long as the bit time slot of the optical output signal 122, that is, two bits. Compared with the optical input short-pulse train 106, the amount of delay is a period of time half as long as the bit time slot of the optical short-pulse train, that is, ½ bit.

In the illustrative embodiment, the electrical input signals 108 have a transmission rate of 40 Gbit/s and the optical output signal 122 has a transmission rate of 160 Gbit/s, so the delay time through the first interferometer 205 is 6.25 ps and the delay time through each of the second and third interferometers 206, 207 is 12.5 ps. The outputs of the interferometers 205, 206 and 207 are converted into electrical signals by the optoelectronic ICs 217, 208 and 209. The converted signals are output to filters 219, 210 and 218, respectively.

On the other hand, the electric circuit group includes low-pass filters 210 and 218, a band-pass filter 219, an RF (Radio Frequency) amplifier 214, peak detectors 213A and 213B, load resistance 215 and 216, a DC (Direct Current) amplifier 212, an arithmetic unit 211, and a temperature controller 220.

Each of the low-pass filters 210 and 218 functions to transmit only signals below a given cutoff frequency and output an average-intensity signal. The band-pass filter 219 functions to transmit signals having a frequency in a specified frequency range and output them to the RF amplifier 214. In the illustrative embodiment, only frequencies with 40 GHz as center are transmitted. The RF amplifier 214 functions to amplify the signal from the band-pass filter 219 and output the amplified signal to the peak detectors 213A and 213B.

Each of the peak detectors 213A and 213B functions to detect the peak value of an input signal. The peak detector 213A is used for detecting the peak value of the amplitude on the positive side of the input signal, while the peak detector 213B is used for detecting the peak value of the amplitude on the negative side of the input signal. The reason why two peak detectors are used is that in the case of a signal whose duty ratio is not 0.5, the amplitude on the positive side differs from that on the negative side and therefore the detection on either side alone cannot obtain an accurate signal intensity. When the duty ratio of a signal is found to be 0.5, a single peak detector may be used.

The load resistance 215 and 216 are connected in series with the peak detectors 213A and 213B, respectively. The load resistance 215 and 216 are used for converting the peak values detected as current signals by the peak detectors 213A and 213B into voltage signals. The DC amplifier 212 functions to add together the amplitude voltage of the first load resistance 215 on the positive side and the amplitude voltage of the second load resistance 216 on the negative side, then amplify the resultant voltage and output to the arithmetic unit 211.

The arithmetic unit 211 functions to calculate the set values of the drive temperatures of the modulators 201, 202, 203 and 204 so that one of the intensity signals from the second interferometer 206 and third interferometer 207 takes its maximum value and the other does its minimum value. The arithmetic unit 211 further functions to calculate the set values of the drive temperatures of the modulators 201, 202, 203 and 204 so that the signal from the first interferometer 205 takes its maximum value. The temperature controller 220 functions to set the temperature of each of the modulators 201, 202, 203 and 204 according to the set values of the modulators 201, 202, 203 and 204 calculated in the arithmetic unit 211.

The above-described first interferometer 205, first optoelectronic IC 217, band-pass filter 219, RF amplifier 214, peak detectors 213A and 213B, load resistance 215 and 216, and DC amplifier 212 as a whole constitute an optical phase difference control system. The first optoelectronic IC 217, band-pass filter 219, RF amplifier 214, peak detectors 213A and 213B, load resistance 215 and 216, and DC amplifier 212 as a whole constitute low-frequency extracting means.

Figures 2, 3:
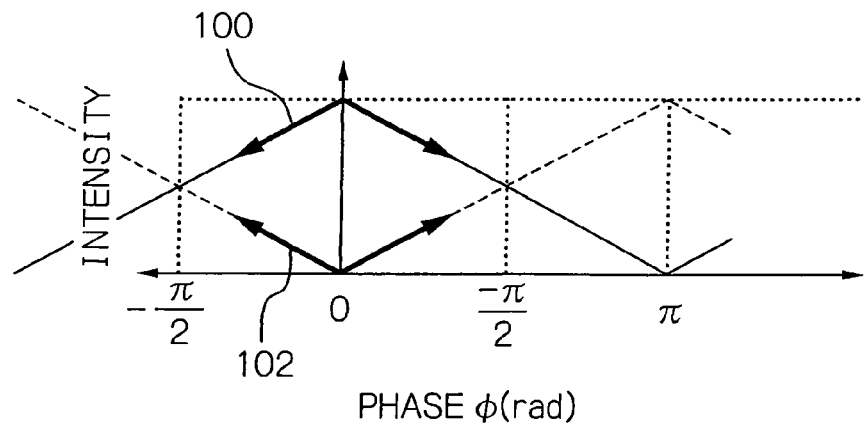
FIG. 2 shows the relative phase of interference light-wave in a conventional optical phase difference control method.
FIG. 3 plots intensity changes of interference light-wave by the conventional phase difference control method.

Next, operation of the optical signal transmitter will be described with reference to FIGS. 2 and 3. Note that an optical phase difference control method according to the present invention may be implemented by the above-described optical phase difference control system.

A 40-GHz optical short-pulse train or stream 106 is split into four short-pulse trains or streams by the optical splitters 110, 112 and 114, and the four short-pulse trains are input to the four modulators 201, 202, 203 and 204, respectively. In the modulators 201, 202, 203 and 204, the four short-pulse trains are modulated by 40-Gbit/s electrical signals and are encoded into 40-Gbit/s optical signals by amplitude shift keying (ASK) with values "1" and "0". The four 40-Gbit/s optical signals output from the modulators 201, 202, 203 and 204 are delayed 12.5 ps by 12.5 ps and are multiplexed into two 80-Gbit/s optical signals 117, 119 by the couplers 116, 118. Furthermore, the two 80-Gbit/s optical signals are given a delay of 6.25 ps and are multiplexed into a single 160-Gbit/s optical signal 122 by the coupler 120.

Part of one of the two 80-Gbit/s signals 117, 119 is input to the second interferometer 206, while part of the other is input to the third interferometer 207. In the second interferometer 206 and third interferometer 207, a delay corresponding to one bit is performed. The optical phase difference within the second interferometer 206 is adjusted in the stage after the second interferometer 206 so that it is zero. The optical phase difference within the third interferometer 207 is adjusted in the stage after the third interferometer 207 so that it is $\pi$. The optical signals output from the second interferometer 206 and third interferometer 207 are converted into electrical signals in the second optoelectronic IC 208 and third optoelectronic IC 209 and are input as average-intensity signals to the arithmetic unit 211 through the low-pass filters 210 and 218.

The arithmetic unit 211 calculates the set values of the drive temperatures of the modulators 201, 202, 203 and 204 so that an intensity signal, which is output from the third interferometer 207 in which the phase difference of the carrier light-wave of adjacent bits is zero, takes its maximum value, and an intensity signal, which is output from the second interferometer 206 in which the phase difference of the carrier light-wave of adjacent bits is $\pi$, is minimum. The arithmetic unit 211 also controls the temperature controller 220 according to the set values to control the temperatures of the four modulators 201, 202, 203 and 204.

Furthermore, part of a single 160-Gbit/s optical signal 122, obtained by multiplexing the above-described two 80-Gbit/s optical signals 117, 119, is input to the first interferometer 205. In the first interferometer 205, the 160-Gbit/s optical signal is split into two optical signals, which are subsequently multiplexed after being delayed by the aforementioned set time, that is, 6.25 ps.

Figure 4:
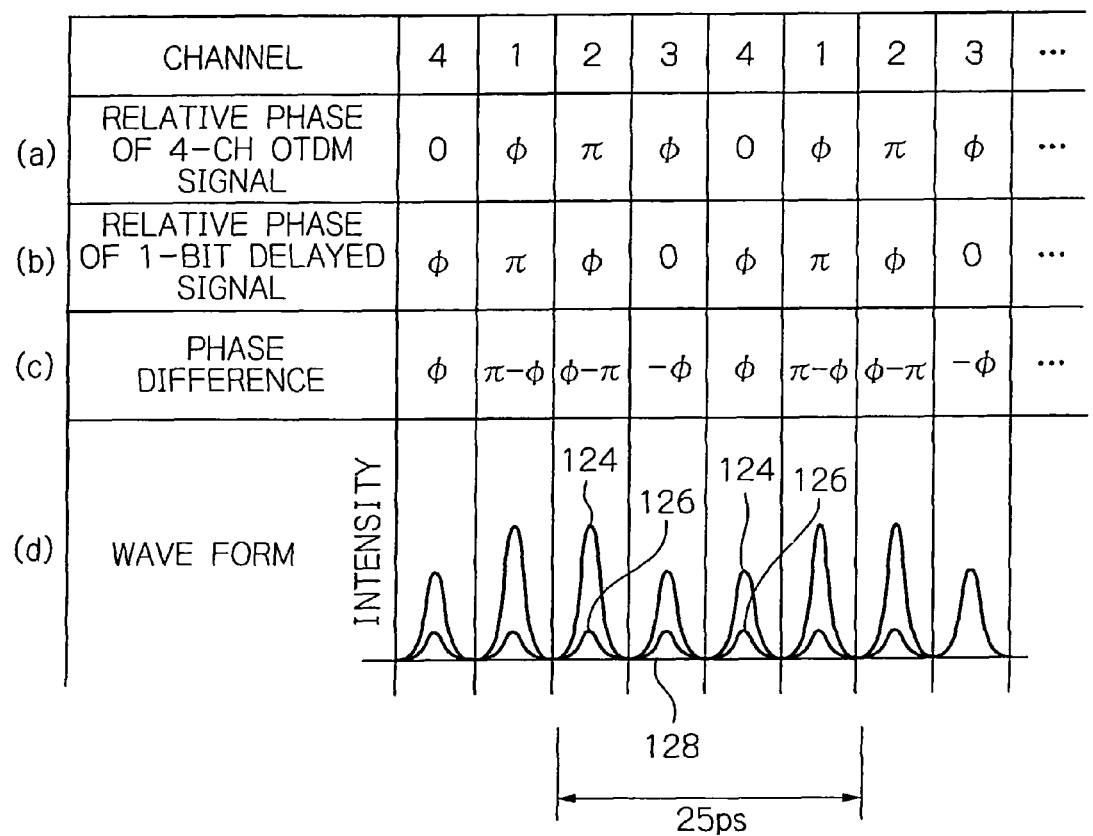
FIG. 4 shows the phase differences and the eye pattern of an interference signal in a first interferometer.

In the case where phase control is not performed, if an error between the above-described two 80-Gbit/s signals 117, 119 is $\phi$, the 160-Gbit/s signal 122 has a phase relationship of (0, $\phi$, $\pi$, $\phi$), as shown in FIG. 4. FIG. 4 shows the relative phase of the carrier of each channel of the 160-Gbit/s signal 122, etc. FIG. 4, line (a), shows the phases, relative to channel 4, of the 160-Gbit/s signal 122 before being delayed, which is input to the first interferometer 205. FIG. 4, line (b), shows the phases relative to channel 4 of the 160-Gbit/s signal after being delayed by one bit. FIG. 4, line (c), shows the phases, relative to channel 4 of the 160-Gbit/s signal before being delayed, of the signal from the first interferometer 205 which is the interference optical signal of the optical signals before and after being delayed. FIG. 4, part (d), shows the eye pattern of the interference light-wave shown in FIG. 4, line (c). This pattern is obtained by resetting a position in the time axis every 4 bits and superposing the signals. The horizontal axis of FIG. 4, part (d), represents time, while the vertical axis represents intensity of interference light-wave.

The eye pattern has its maximum, intermediate and minimum value curves 124, 126 and 128, the latter actually being straight. The curves 124, 126, and 128 are generated for the following reasons. Each data bit has either value "0" or "1" at the probability of ½. For this reason, when values "1" are consecutive, interference light-wave has its maximum value and therefore the maximum value curve 124 is generated. When values "0" and "1" appear alternately, the intermediate value curve 126 is generated, and when values "0" are consecutive, the minimum value line 128 is generated. In FIG. 4, part (d), the intensity of interference light-wave whose phase difference is ($\pi-\phi$) or ($\phi-\pi$) is larger than that of interference light-wave whose phase difference is ($\phi$) or ($-\phi$). This is because part (d) shows the case where the magnitude of the error $\phi$ is near $\pi$. In the case where the magnitude of the error $\phi$ is near zero, the intensity of interference light-wave whose phase difference is ($\pi-\phi$) or ($\phi-\pi$) becomes smaller than that of interference light-wave whose phase difference is ($\phi$) or ($-\phi$).

When the signal shown in FIG. 4, line (a), is input to the first interferometer 205, the signal is delayed by one bit within the first interferometer 205 and therefore it interferes in phase differences of ($\phi$), ($\pi-\phi$), ($\phi-\pi$), and ($-\phi$) at 1-bit intervals. In the waveform due to this interference, as shown in part (d), a set of two adjacent bits in the output signal of the first interferometer 205 varies the same as a variation in the error $\phi$. At this time, the output signal of the first interferometer 205 has the same intensity every two bits, as shown in part (d). If waveforms of two adjacent bits are added together, a signal represented by the resultant waveform contains a 40-GHz component. This embodiment makes use of this 40-GHz component. To extract this component, the optical output signal of the first interferometer 205 is converted into an electrical signal by the first optoelectronic IC 217 and is passed through the band-pass filter 219. This signal is subsequently amplified in the RF amplifier 214. Next, as previously described, the signal is split into two signals for peak detection, which are input to the peak detectors 213A and 213B. Next, voltages on the load resistance 215 and 216 are detected with the DC amplifier 212 and are output to the arithmetic unit 211.

The arithmetic unit 211 calculates the set values of the drive temperatures of the modulators 201, 202, 203 and 204 so that the detection signal has its maximum value. The arithmetic unit 211 sets the temperatures of the four modulators 201, 202, 203 and 204 through the temperature controller 220 according to the calculated set values. The detection signal has its maximum value when the phase difference between channels 1 and 2 is $\pi$ or $-\pi$ and the phase difference between channels 3 and 4 is zero, or when the phase difference between channels 1 and 2 is zero and the phase difference between channels 3 and 4 is $\pi$ or $-\pi$.

Therefore, if the detection signal is controlled so as to be maximum, when the magnitude of the error $\phi$ is near $\pi$ the magnitude is controlled so it becomes $\pi$, and when the magnitude of the error $\phi$ is near zero the magnitude is controlled so it becomes zero. As a result, in either case, the phase difference is controlled to an accurate phase difference. Thus, the magnitude of the error $\phi$ is controlled so it becomes 0 or $\pi$. When the magnitude of the error $\phi$ is zero, the phase relationship of the multiplexed signal is (0, 0, $\pi$, 0). When the magnitude of the error $\phi$ is $\pi$, the phase relationship of the multiplexed signal is (0, $\pi$, $\pi$, $\pi$). In fiber transmission, relative phases are significant, so the two phase relationships are equivalent to each other. This will be described in further detail.

As described above, the interference signal (wave form shown in FIG. 4, part (d)), obtained by the interference between the 160-Gbit/s signal 122 and this signal after being delayed one bit, is a signal whose intensity varies every two bits by the relative phase $\phi$. In the interference signal, when the magnitude of the error $\phi$ is zero, channels 3 and 4 become maximum in intensity. On the other hand, channels 1 and 2 become minimum in intensity because there are pulses canceling out each other as a result of interference. When the magnitude of the error $\phi$ is $\pi$, channels 3 and 4 become minimum in intensity and channels 1 and 2 become maximum in intensity. When the magnitude of the error $\phi$ is $\pi/2$, interference becomes equal in all channels. That is, the 40-GHz component becomes maximum in intensity when the magnitude of the error $\phi$ is 0 or $\pi$ and minimum in intensity when the magnitude of the error $\phi$ is $\pi/2$.

Figure 5:
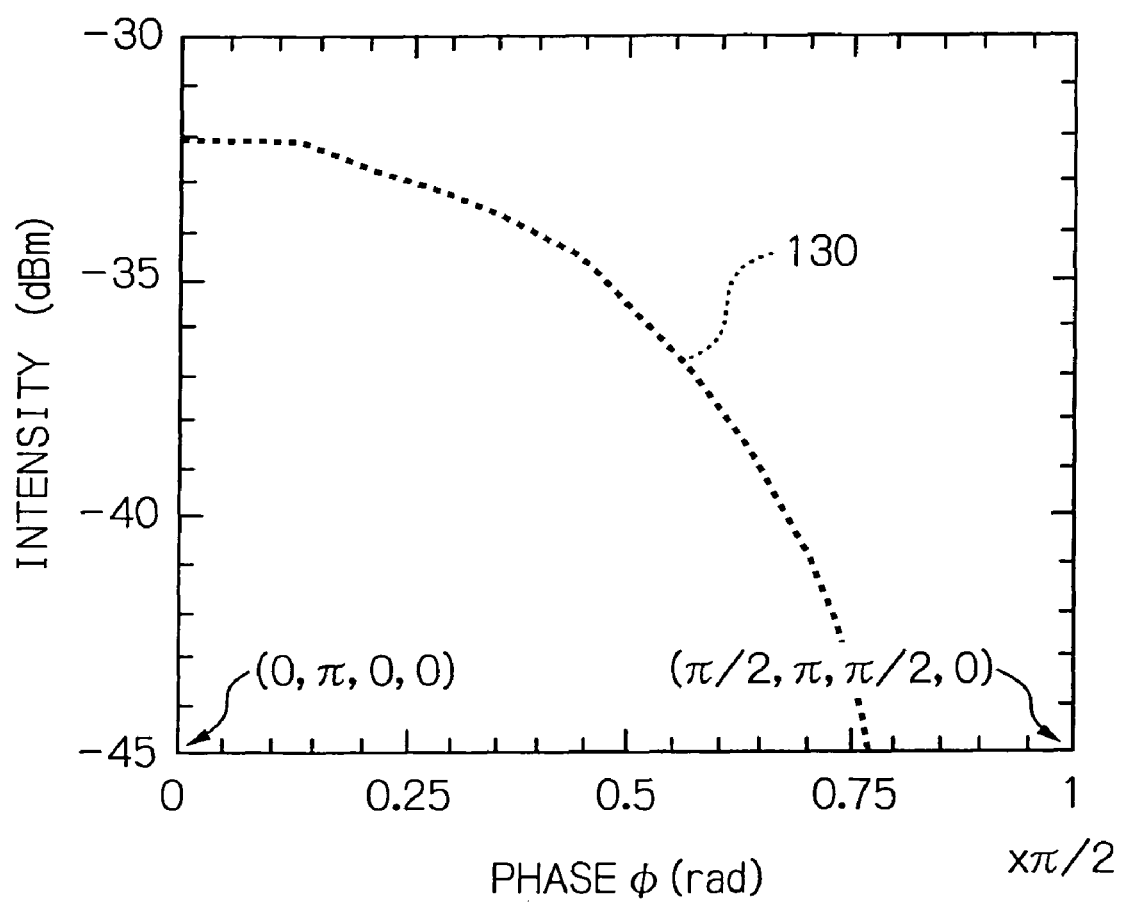
FIG. 5 plots 40-GHz components calculated and contained in the interference signal.

The results of calculation of the 40-GHz component contained in the interference signal are plotted in FIG. 5, which shows an intensity curve 130 of interference light-wave when the magnitude of the error $\phi$ is a value near zero. The horizontal axis represents the error $\phi$ in radian, while the vertical axis represents the 40 GHz component of intensity of interference light-wave in dBm. From the figure it follows that the intensity of the 40-GHz component is high when the magnitude of the error $\phi$ is zero. Hence, based on the 40-GHz component signal, feedback control is performed on the drive temperatures of the modulators 210, 202, 203 and 204.

As has been described hereinabove, according to the preferred embodiment, if the optical phases of the two 80-Gbit/s signals 117 and 119 are adjusted and, as with the prior art, feedback control is performed on the drive temperatures of the modulators 210, 202, 203 and 204, then the carrier phase difference between bits that are spaced one bit therebetween can be controlled.

In addition, if, based on the interference signal obtained by the interference between the 160-Gbit/s signal and this signal after being delayed 1 bit, that is, the signal of the 40-GHz component of the waveform shown in FIG. 4D, feedback control is performed again on the drive temperatures of the modulators 210, 202, 203 and 204, then the carrier phase difference between bits that are spaced one bit therebetween can be controlled.

In the above embodiment, while it has been described that four 40-Gbit/s signals are combined into a single 160-Gbit/s signal, other transmission rates can be used. Even in such cases, the same advantages as those described above are obtainable.

In the above embodiment, it has been described that feedback control is performed on the EA (Electro-Absorption) modulators. However, in the present invention it is possible to insert in the circuit a material, such as a glass block, which can change a difference in optical path length, and control such a material. The present invention is applicable to all of optical phase difference control systems including means for controlling a controller which can change a difference in optical path length.

In the above embodiment, while heat is controlled in order to change a difference in optical path length, in the present invention voltage, etc may be used. In addition, objects to be adjusted are not limited to the modulators 201, 202, 203 and 204. The present invention is also applicable to materials, such as a glass block, which can change a difference in optical path length, and to all the existing members that can be controlled by adjusting heat, voltage, etc.

The entire disclosure of Japanese patent application No. 2006-7618 filed on Jan. 16, 2006, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An optical signal transmitter comprising:
   a plurality of modulators for receiving a plurality of optical short-pulse trains and encoding the plurality of optical short-pulse trains to output a plurality of modulated optical signals;
   a first interferometer for receiving part of a single optical time-division multiplexed transmission signal, obtained by multiplexing the plurality of modulated optical signals encoded by said modulators, to split it into first and second signals, and giving, between the first and second signals, a phase difference equivalent to one bit of the optical time-division multiplexed signal, and thereafter multiplexing the first and second signals;
   a low-frequency extractor for adding together signals, output from the first interferometer, which have similar intensity every two successive bits, and extracting a low-frequency waveform signal as a signal for controlling the phase difference of the single optical time-division multiplexed signal;
   a second interferometer for receiving a second optical time-division multiplexed transmission signal, obtained by multiplexing a first portion of the plurality of modulated optical signals, to split it into third and fourth signals, and giving, between the third and fourth signals, a phase difference equivalent to one bit of the one optical time-division multiplexed signal, and thereafter multiplexing the third and fourth signals;
   a third interferometer for receiving a third optical time-division multiplexed transmission signal, obtained by multiplexing a second portion of the plurality of modulated optical signals, to split it into fifth and sixth signals, and giving, between the fifth and sixth signals, a phase difference equivalent to one bit of the other optical time-division multiplexed signal, and thereafter multiplexing the fifth and sixth signals; and
   a controller connected to said modulators and said first, second and third interferometers for receiving the second and third optical time-division multiplexed signals from said second and third interferometers, and adjusting said modulators so that an optical phase difference in the second and third optical time-division multiplexed signals is zero, and for adjusting said modulators so that the signal extracted by the low-frequency extractor has a maximum value.

2. The transmitter in accordance with claim 1, wherein said second interferometer is disposed between said modulators and a point at which the single optical time-division multiplexed transmission signal is obtained.

3. The transmitter in accordance with claim 1, wherein each of said first, second and third interferometers has an optoelectronic circuit for respectively converting optical intensity of the single, second and third optical time-division multiplexed signals into corresponding electrical intensity.

4. The transmitter in accordance with claim 1, wherein said third interferometer is disposed between said modulators and a point at which the third optical time-division multiplexed transmission signal is obtained.

5. The transmitter in accordance with claim 1, wherein said controller comprises a temperature controller operative in response to the second and third optical time-division multiplexed signals from said second and third interferometers to control a temperature of said modulators.

6. The transmitter in accordance with claim 5, wherein said controller further comprises:
   a peak detector for receiving the low-frequency waveform signal output from said low-frequency extractor to detect a peak of the low-frequency waveform signal; and
   an arithmetic unit operative in response to the peak detected by said peak detector and the second and third optical time-division multiplexed signals from said second and third interferometers for setting said temperature controller so as to render the peak maximum.

7. An optical signal transmitter comprising:
   a plurality of modulators for receiving and encoding a plurality of optical short-pulse trains, and outputting a plurality of modulated optical signals;
   a first interferometer for receiving a part of a single optical time-division multiplexed transmission signal, splitting the received single optical time-division multiplexed transmission signal into first and second signals, giving, between the first and second signals, a phase difference equivalent to one bit of the single optical time-division multiplexed signal, and multiplexing the first and second signals, the single optical time-division multiplexed transmission signal being obtained by multiplexing the plurality of modulated optical signals;

a low-frequency extractor for adding together the first and second signals, and extracting a low-frequency waveform signal for controlling a phase difference of the single optical time-division multiplexed signal, the first and second signals having similar intensity every two successive bits;

a second interferometer for receiving a first optical time-division multiplexed transmission signal obtained by multiplexing two of the plurality of modulated optical signals, splitting the first optical time-division multiplexed transmission signal into third and fourth signals, and giving, between the third and fourth signals, a phase difference equivalent to one bit of the first optical time-division multiplexed signal, and multiplexing the third and fourth signals;

a third interferometer for receiving a second optical time-division multiplexed transmission signal obtained by multiplexing another two of the plurality of modulated optical signals, splitting the second optical time-division multiplexed transmission signal into fifth and sixth signals, and giving, between the fifth and sixth signals, a phase difference equivalent to one bit of the second optical time-division multiplexed signal, and multiplexing the fifth and sixth signals; and a controller connected to said modulators and said first, second and third interferometers for receiving the first and second optical time-division multiplexed signals from said second and third interferometers respectively, and adjusting said modulators so that an optical phase difference in the first and second optical time-division multiplexed signals is zero, and for adjusting said modulators so that the signal extracted by the low-frequency extractor has a maximum value.

8. The transmitter in accordance with claim 7, wherein said second and third interferometers are disposed between said modulators and a point at which the single optical time-division multiplexed transmission signal is obtained.

* * * * *